(12) United States Patent
Lai et al.

(10) Patent No.: US 7,669,808 B2
(45) Date of Patent: Mar. 2, 2010

(54) DISPLAY MODULE EXHIBITION STATION

(75) Inventors: Chun-Zu Lai, Hsinchu (TW); Jen-Yu Shih, Kaohsiung (TW); Guo-Dong Peng, Hsinchu (TW)

(73) Assignee: TPO Displays Corp., Chu-nan, Miao-Li County (TW)

( * ) Notice: Subject to any disclaimer, the term of this patent is extended or adjusted under 35 U.S.C. 154(b) by 1699 days.

(21) Appl. No.: 10/840,375

(22) Filed: May 7, 2004

(65) Prior Publication Data

US 2005/0056750 A1 Mar. 17, 2005

(30) Foreign Application Priority Data

May 13, 2003 (TW) .............................. 92208704 U

(51) Int. Cl.
*A47F 5/00* (2006.01)
(52) U.S. Cl. .................... 248/122.1; 248/917; 248/919; 248/923
(58) Field of Classification Search ......... 248/917–923, 248/122.1, 121; 312/293.2, 330.1
See application file for complete search history.

(56) References Cited

U.S. PATENT DOCUMENTS

| | | | | |
|---|---|---|---|---|
| 2,673,783 A | * | 3/1954 | Rahm et al. .................. 312/312 |
| 4,213,679 A | * | 7/1980 | Sakamoto et al. ............. 353/72 |
| 4,351,592 A | * | 9/1982 | Link et al. ..................... 353/72 |
| 4,851,812 A | * | 7/1989 | Holmberg ................. 340/407.2 |
| 5,212,628 A | * | 5/1993 | Bradbury ............... 361/679.44 |
| 5,242,056 A | * | 9/1993 | Zia et al. ..................... 206/576 |
| 5,590,022 A | * | 12/1996 | Harvey .................... 361/679.41 |
| 5,629,832 A | * | 5/1997 | Sellers ................... 361/679.55 |
| 5,802,801 A | * | 9/1998 | Hohns et al. ................ 52/792.1 |
| 5,973,917 A | * | 10/1999 | White ..................... 312/223.2 |
| 6,028,768 A | * | 2/2000 | Cipolla ................... 361/679.12 |
| 6,168,250 B1 | * | 1/2001 | Rogov ......................... 312/294 |
| 6,201,532 B1 | * | 3/2001 | Tode et al. ................... 345/156 |
| 6,435,633 B2 | * | 8/2002 | Hoshi ......................... 312/242 |
| 6,442,030 B1 | * | 8/2002 | Mammoser et al. ......... 361/727 |
| 6,824,232 B2 | * | 11/2004 | Farmer ..................... 312/293.2 |
| 7,243,395 B2 | * | 7/2007 | Haymond .................... 16/86 R |
| 7,246,780 B2 | * | 7/2007 | Oddsen, Jr. .............. 248/282.1 |

FOREIGN PATENT DOCUMENTS

| | | |
|---|---|---|
| CN | 2371849 Y | 4/2000 |
| CN | 25133321 Y | 9/2002 |

* cited by examiner

*Primary Examiner*—Amy J Sterling
(74) *Attorney, Agent, or Firm*—Birch, Stewart, Kolasch & Birch, LLP

(57) ABSTRACT

A display module exhibition station includes a housing body, a bottom lid and a movable bracket. The bottom lid has one end pivotally engaged with the housing body to form an openable case. The movable bracket may hold a display module. The movable bracket is pivotally engaged with an inner side of the housing body and may be extended outside the openable case to exhibit the display module or house the display module inside the openable case to facilitate carrying of the exhibition station.

21 Claims, 10 Drawing Sheets

DISPLAY MODULE EXHIBITION STATION

This application claims the benefit of priority of Taiwan, R.O.C. Patent Application No. 92208704, filed May 13, 2003 in the Taiwan Intellectual Property Office, the disclosure of which is incorporated herein in its entirety by reference.

FIELD OF THE INVENTION

The invention relates to an exhibition station and particularly to a portable and foldable exhibition station for displaying a display module.

BACKGROUND OF THE INVENTION

Electronic instruments mostly have a display module to display information. At present, the Liquid Crystal Display Module (LCM) is the display module that has attracted great attention and is fiercely pursued by many vendors. In general, when the vendors exhibit the display module, they usually set up an exhibition station for mounting and exhibiting the display module thereon.

Refer to FIG. 1 for a conventional display module exhibition station. This exhibition station includes a box 1 and a support bracket 2. The box 1 has an opening (not shown in the drawing). The support bracket 2 has one end fixed inside the box 1 and other end extended through the opening to hold a display module 3 for exhibition.

However, the support bracket 2 of such an exhibition station cannot be bent or folded in a portable fashion. It must be carried by hand or be packaged separately for carrying. And hitting or impact easily damages the display module 3 while carrying it. Therefore; designing a display module exhibition station to facilitate carrying is important.

SUMMARY OF THE INVENTION

The invention provides a display module exhibition station to facilitate carrying.

The display module exhibition station according to the invention is mounted onto a system box to enable the display module to obtain electric power and signals from the system box during exhibition.

The display module exhibition station includes a housing body, a bottom lid and a movable bracket. The bottom lid is located above the system box and has one end pivotally engaged with the housing body to form an openable case with the housing body. The openable case has an opening opposing the pivotal end. The movable bracket is pivotally engaged with an inner side of the housing body closed to the opening. The movable bracket includes a holding rack for holding the display module and a support rack, which has one end connecting to the holding rack and other end pivotally engaging with the housing body so that the movable bracket may be housed in the openable case or extended outside the openable case through the opening. The support bracket and the housing body also form a selected angle therebetween.

By means of the exhibition station of the invention, the movable bracket may be housed and held in the openable case or extended outside the openable case. Thus it may be folded to in a portable fashion to facilitate carrying.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
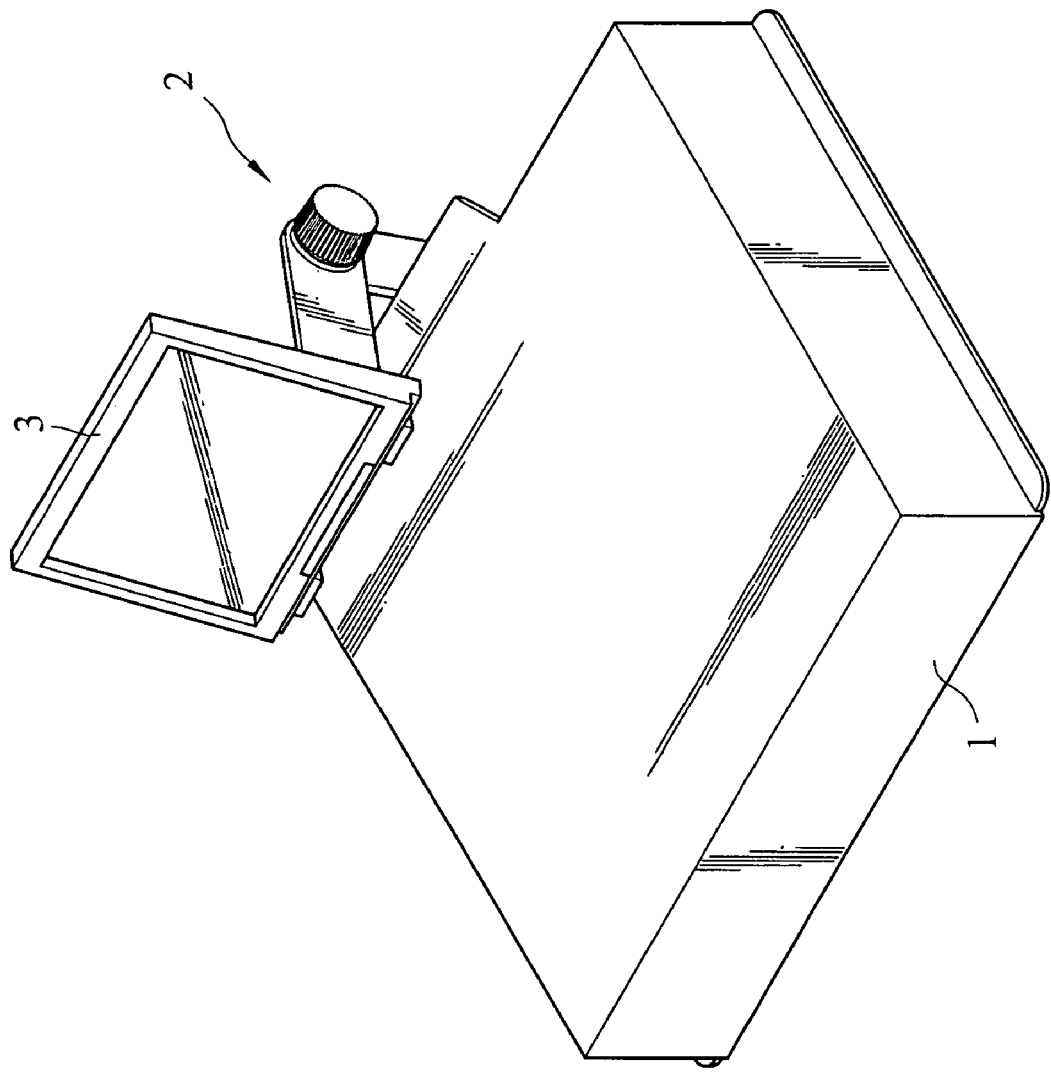
FIG. 1 is a perspective view of a conventional display module exhibition station.

The display module exhibition station according to the invention is located above a system box to enable the display module to obtain electric power and signals from the system box when it is exhibited.

Referring to FIGS. 2 through 5, the display module exhibition station includes a bottom lid 41, a housing body 42, a movable bracket 43, fastening elements 44, washers 45 and elastic elements 46.

The bottom lid 41 is mounted onto a system box and has fastening holes 411 corresponding to the system box to receive fasteners (such as screws or the like, not shown in the drawings) to fasten the bottom lid 41 to the system box. The bottom lid 41 has two upward flanges 412 abutting two opposing ends (when closed) of the housing body 42. The outer surface of the flanges 412 has a coupling member 4121 made from a magnetic material.

The housing body 42 is made of metal to mate the magnetic coupling member 4121. The bottom lid 41 is pivotally engaged with the housing body 42 to form an openable case 42. When the openable case 42 is closed, the flanges 412 and the housing body 42 are coupled tighter because of the coupling member 4121. The openable case 4 has an opening 421 on other end, opposing the pivotal end of the bottom lid 41 and the housing body 42. The housing body 42 further has latch flanges 422 extended on two ends adjacent to the system box, to latch on the system box (in latch flutes formed on the system box corresponding to the latch flanges 422). The housing body 42 has a buffer element 423 (such as sponge) to alleviate impact and friction occurring between the movable bracket 43 and the housing body 42.

Figure 2:
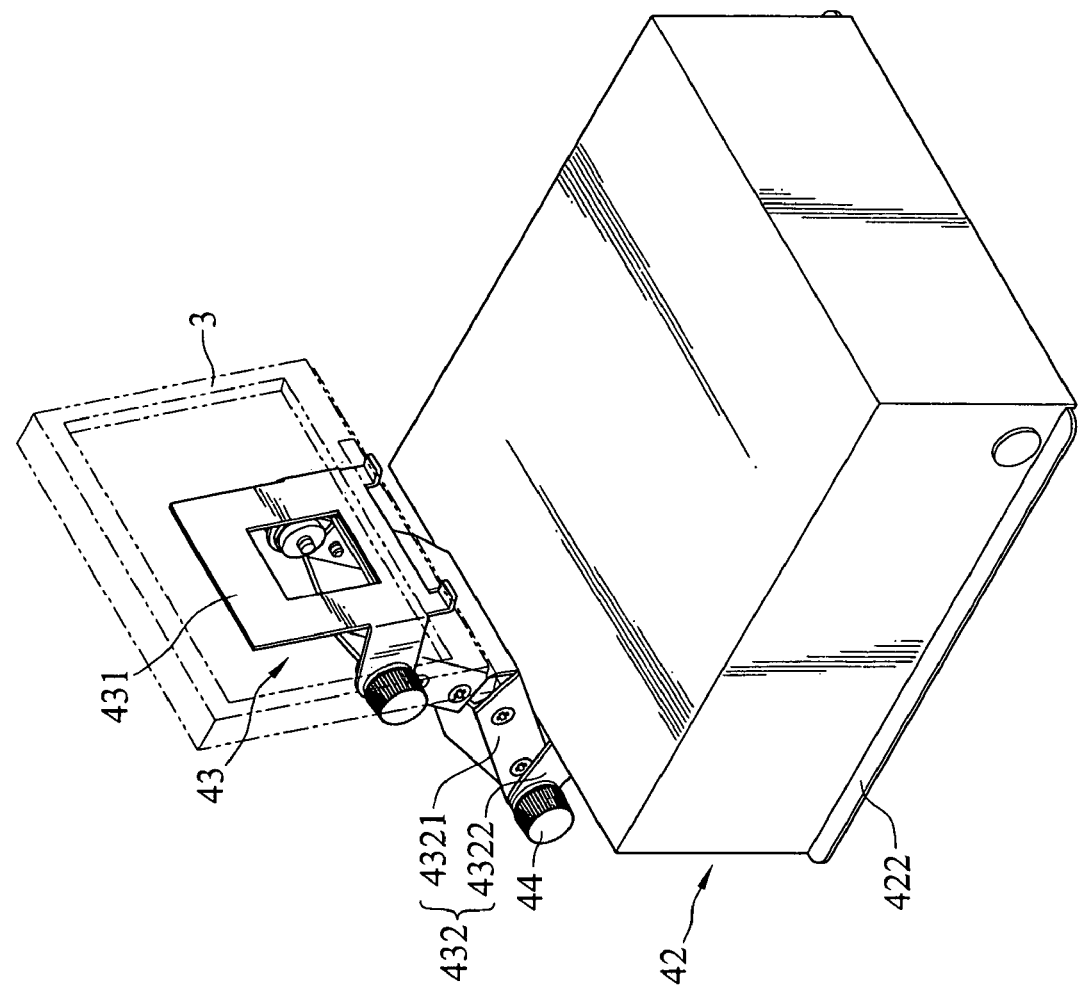
FIG. 2 is a side perspective view of the invention.
Figure 3:
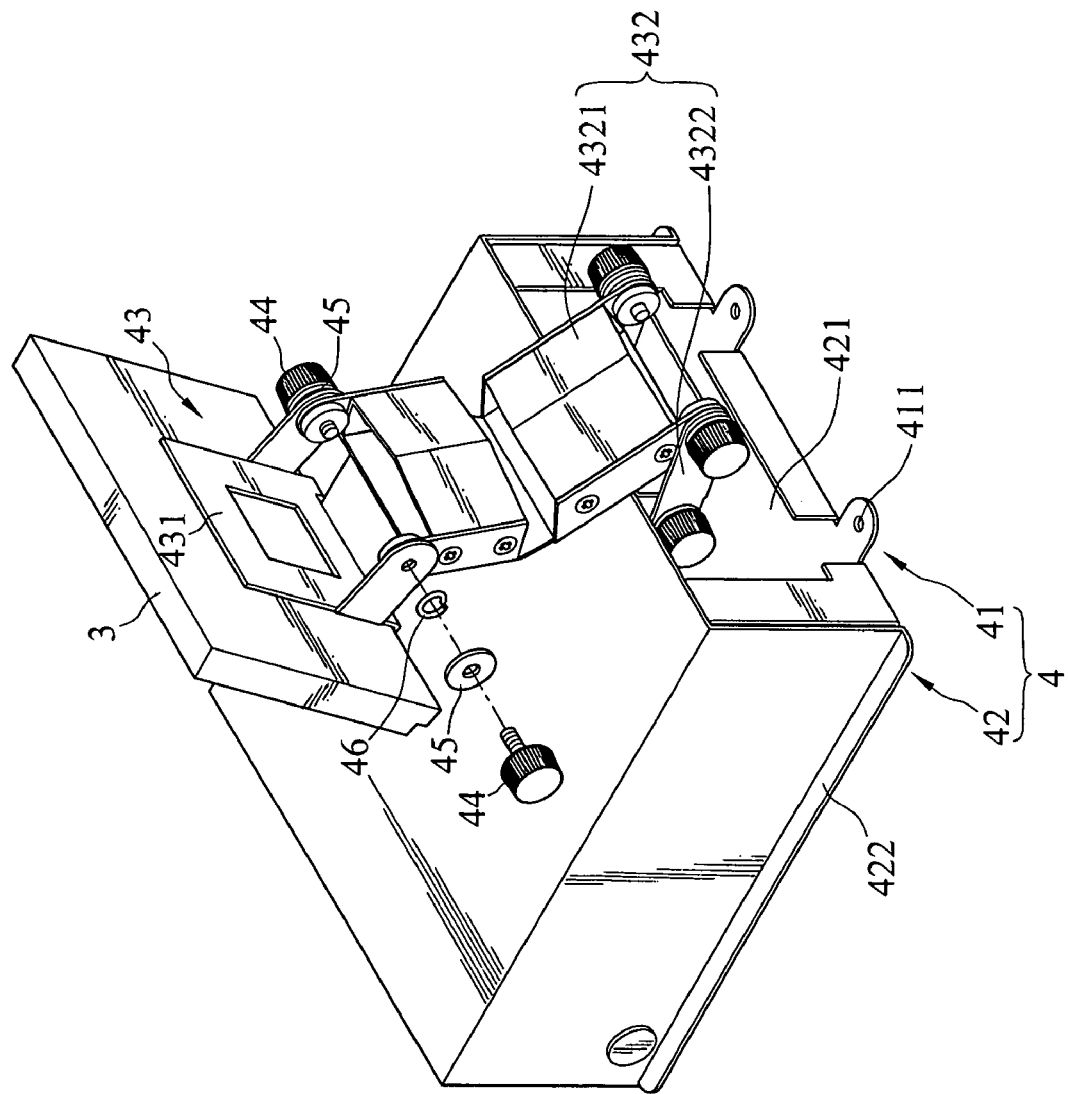
FIG. 3 is a rear perspective view of the invention.
Figure 4:
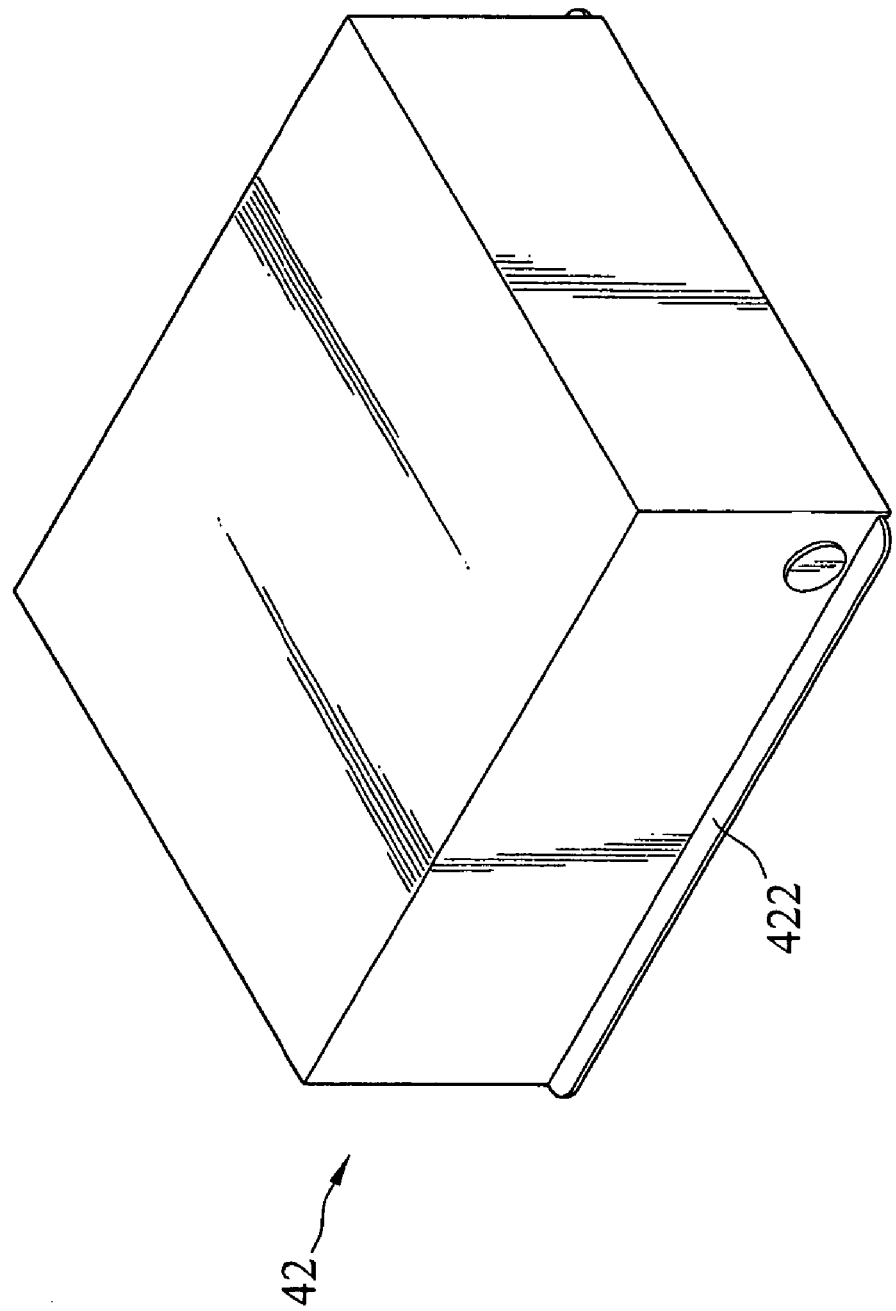
FIG. 4 is a perspective view of the invention folded in a portable fashion.
Figure 5:
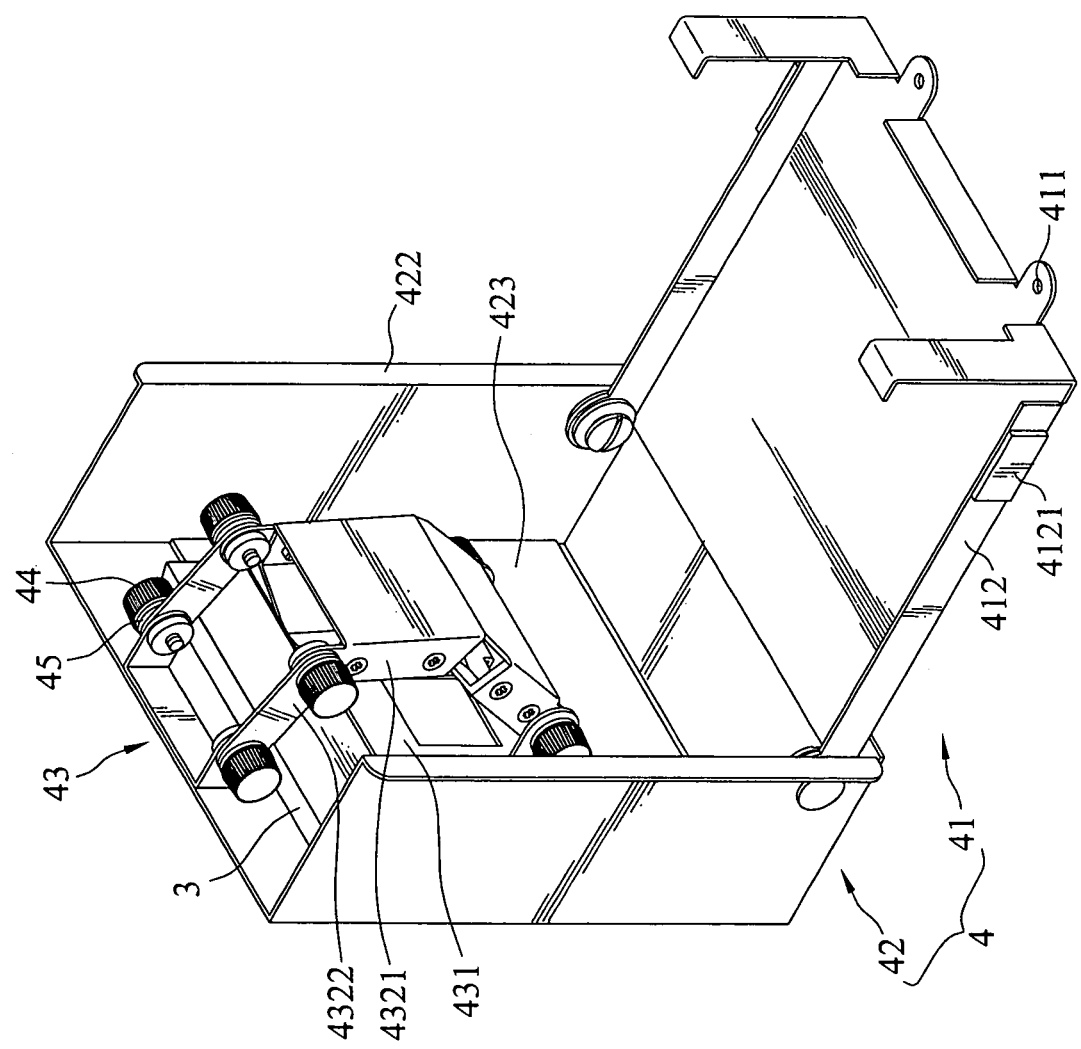
FIG. 5 is a perspective view of the openable case of the invention in an opening condition.
Figure 6A:
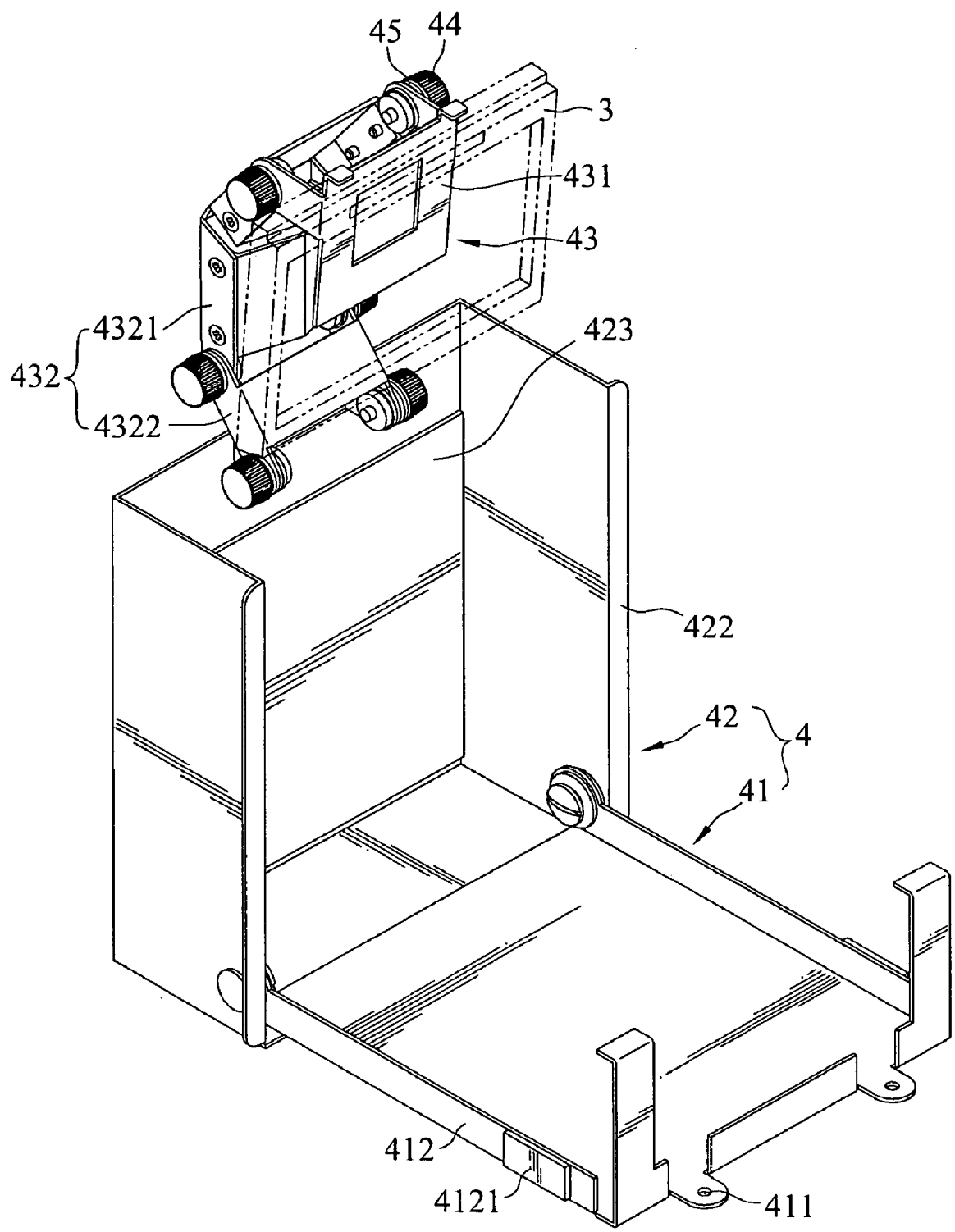
FIG. 6A is a perspective view of the invention with the openable case opened and the movable bracket moved outside the housing body.
Figure 6B:
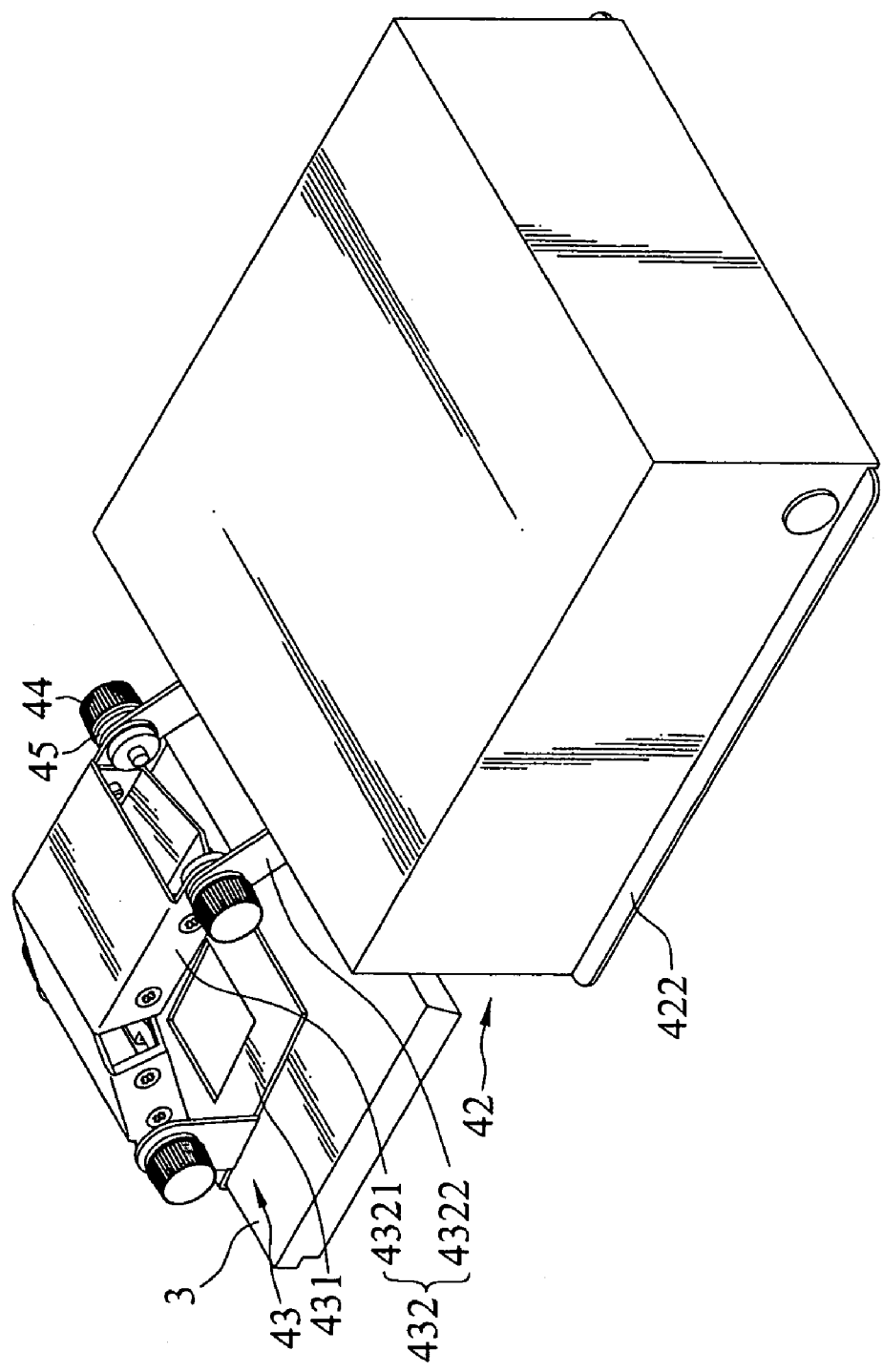
FIG. 6B is a perspective view of the invention with the openable case closed and the movable bracket moved outside the housing body.
Figure 6C:
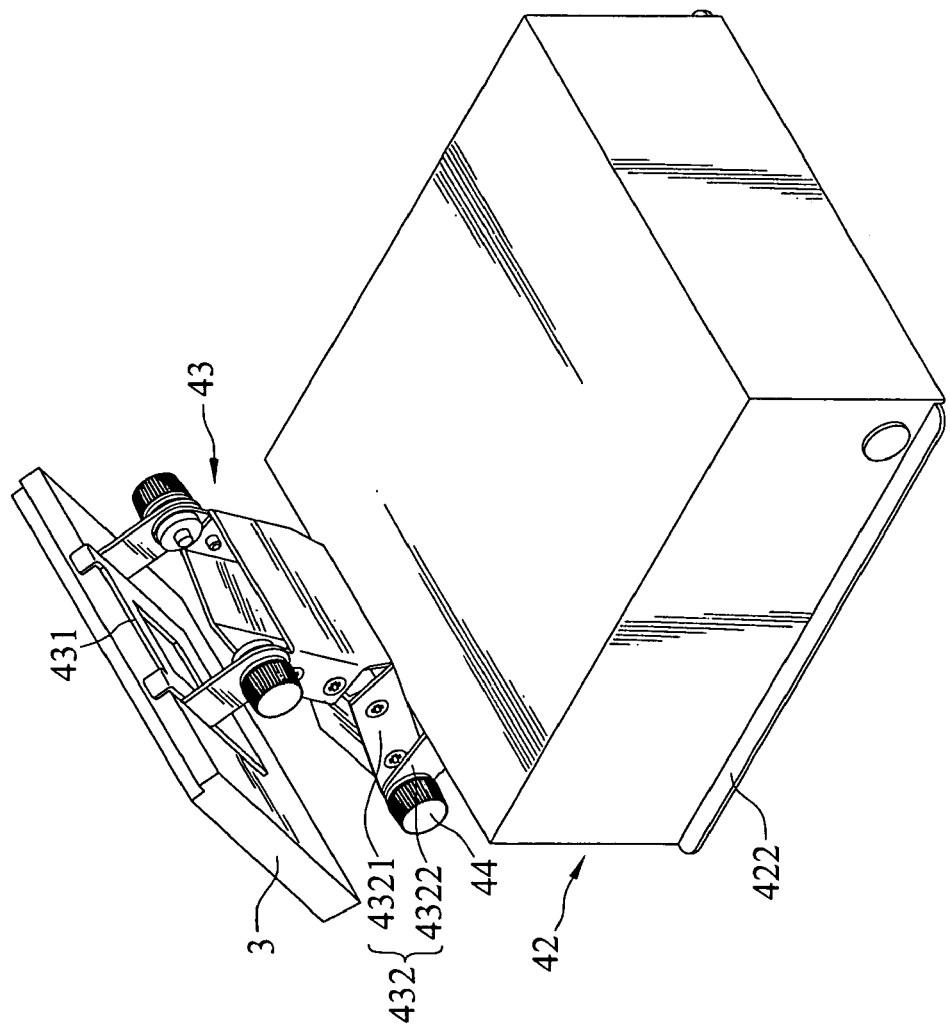
FIG. 6C is a perspective view of the invention with the openable case closed and the movable bracket moved outside the housing body, and the elements of the movable bracket adjusted to selected angles.

The movable bracket 43 is pivotally located on an inner side of the housing body 42 closed to the opening 421. It includes a holding rack 431 and a support rack 432. The holding rack 431 is for holding a display module 3 (as shown in FIGS. 2, 3 and 5, where a LCM is shown). The support rack 432 includes a first support rack 4321 and a second support rack 4322. The first support rack 4221 has two ends respectively and is pivotally engaged with the holding rack 431 and the second support rack 4322. The first support rack 4321 and the second support rack 4322 form an angle which may be selectively fixed. The first support rack 4321 and the holding rack 431 also form another angle, which may be selectively fixed to alter the exhibition angle of the display module 3. The second support rack 4322 has the other end pivotally engaged with the housing body 42. Thus the movable bracket 43 may be housed inside the openable case 4 or extended outside the openable case 4 through the opening 421. Further, the angle between the support bracket 432 and the housing body 42 may be selectively fixed.

To fix the angles of any two elements mentioned above, there are screw holes located on the two corresponding elements, and a fastening element 44 running through a washer 45, an elastic element 46 and two screw holes (not shown in the drawings) in this order to pivotally engage the two elements and fix the angle formed therebetween. With the elastic element 46, the angle between any two elements may still be adjusted. As shown in the drawings, the pivotally engaged elements are the first support rack 4321 and holding rack 431, the first support rack 4321 and the second support rack 4322, and the second support rack 4322 and the housing body 42.

Referring to FIGS. 5, 6A, 6B and 6C, the movable bracket 43 is housed in the openable case 4. When there is a desire to extend the movable bracket 43 outside the openable case 4 through the opening 421, first, open the openable case 4 to separate the bottom lid 41 from the housing body 42; next, move the movable bracket 43 outside the housing body 42; then close the openable case 4 and couple the bottom lid 41 with the housing body 42; continuously adjust the angles of various elements of the movable bracket 43 (fix the angles through the fastening elements 44 once desired angles are reached) to obtain a desired exhibition angle for the display module 3.

Figure 7:
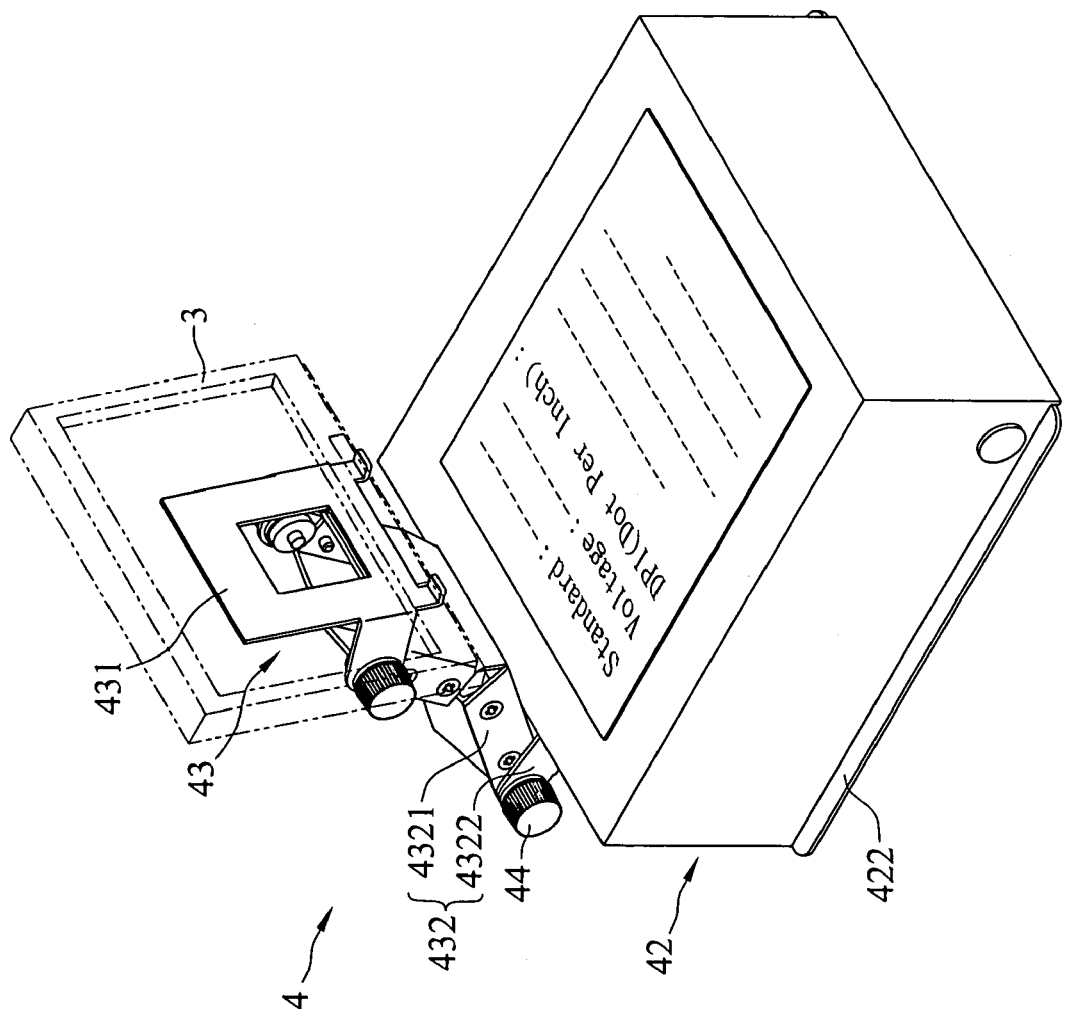
FIG. 7 is a perspective view of the invention, showing the openable case boned to a specification table of the exhibiting display module.

Referring to FIG. 7, during exhibition, a specification table of the display module 3 may be bonded to the exterior of the housing body 42 of the openable case 4 to facilitate exhibition.

Figure 8:
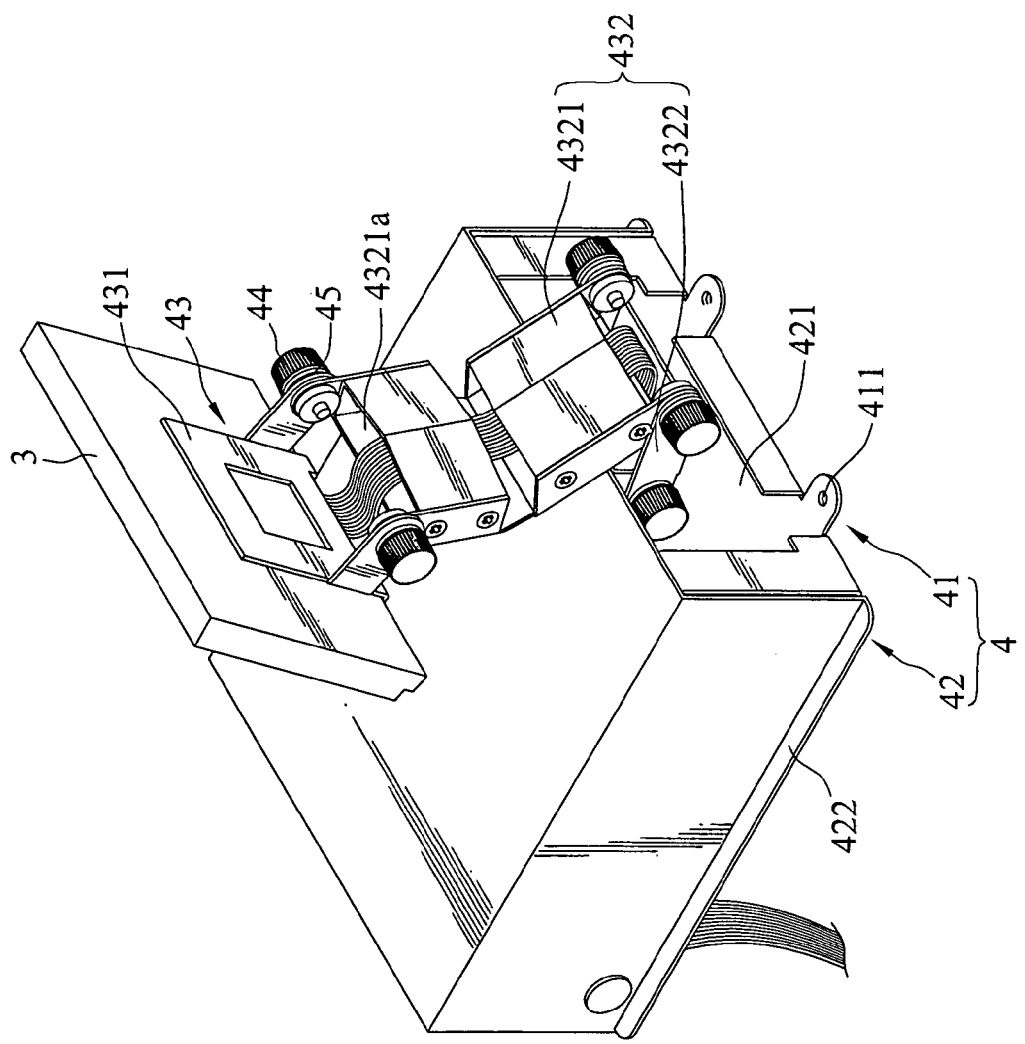
FIG. 8 is a perspective view of the invention, showing cables of the display module passing through a cable opening of the movable bracket.

Referring to FIG. 8, the first support rack 4321 and the second support rack 4322 may include a cable opening 4321a so that when the display module 3 is held on the holding rack 431, the cables of the display module 3 may pass through the cable opening 4321a and the openable case 4 to connect to the system box, to obtain electric power and signals.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A display module exhibition station mounted onto a system box to obtain required electric power and signals from the system box during a display module is in exhibition, comprising:
    a housing body;
    a bottom lid located above the system box having one end pivotally engaged with the housing body to form an openable case, the openable case having an opening formed on one end opposing the pivotal end of the bottom lid and the housing body; and
    a movable bracket, pivotally engaged with an inner side of the housing body closed to the opening, including a holding rack for holding the display module and a support rack which has one end connecting to the holding rack and the other end pivotally engaged with the housing body such that the movable bracket is allowed to be housed in the openable case and extended outside the openable case through the opening to selectively fix a relative angle between the support track and the housing body,
    wherein the bottom lid is located above the system box and has a fastening hole to receive a fastener to fix the bottom lid on the system box.

2. The display module exhibition station of claim 1, wherein the bottom lid has two upward flanges on two sides abutting two opposing ends of the housing body, each upward flange having an outer surface attaching to a coupling member to increase coupling tightness of the flange and the housing body.

3. The display module exhibition station of claim 1, wherein the housing body has a latch flange on one end abutting the system box to latch the housing body on the system box.

4. The display module exhibition station of claim 1, wherein the housing body includes a buffer element on an inner side thereof to alleviate impact and friction between the housing body and the movable bracket when the movable bracket is housed in the openable case.

5. The display module exhibition station of claim 1, further having a plurality of fastening elements, the support rack having two ends each includes a first screw hole, the housing body having a second screw hole corresponding to the first screw hole to allow the support rack and the housing body to pivotally engage with each other through the fastening elements.

6. The display module exhibition station of claim 5, further having pairs of elastic elements and washers, each of the fastening elements running through the washer, the elastic element, the first screw hole and the second screw hole in this order to adjust the relative angle between the support rack and the housing body.

7. The display module exhibition station of claim 1, wherein the support rack has one end pivotally engaged with the holding rack to selectively fix a relative angle between the holding rack and the support rack to alter an exhibition angle of the display module.

8. The display module exhibition station of claim 1, wherein the support rack includes a first support rack and a second support rack, the first support rack having two ends respectively and pivotally engaged with the holding rack and the second support rack, the second support rack being pivotally engaged with the housing body, the first support rack and the second support rack forming an angle which is fixable selectively.

9. The display module exhibition station of claim 8, wherein the first support rack and the second support rack have respectively a cable opening to allow cables of the display module to pass through and connect to the system box when the display module is mounted onto the system box to obtain the electric power and the signals.

10. A display module exhibition station mounted onto a system box to obtain required electric power and signals from the system box during a display module is in exhibition, comprising:
    a housing body located on the system box having an opening;
    a bottom lid having a pivotal end pivotally engaged with the housing body to form an openable case with the housing body, wherein the opening of the housing body is disposed adjacent to one end opposing the pivotal end of the bottom lid; and a movable bracket pivotally engaged with an inner side of the housing body closed to the opening including a holding rack for holding the display module and a support rack which has one end connecting to the holding rack and other end pivotally engaged with the housing body such that the movable bracket is allowed to be housed in the housing body and extended outside the housing body through the opening to selectively fix a relative angle between the support track and the housing body, wherein the bottom lid is located above the system box, and wherein the bottom lid is located above the system box and has a fastening hole to receive a fastener to fix the bottom lid on the system box.

11. The display module exhibition station of claim 10, wherein the bottom lid has two upward flanges on two sides abutting two opposing ends of the housing body, each upward flange having an outer surface attaching to a coupling member to increase coupling tightness of the flange and the housing body.

12. The display module exhibition station of claim 10, wherein the housing body has a latch flange on one end abutting the system box to latch the housing body on the system box.

13. The display module exhibition station of claim 10, wherein the housing body includes a buffer element on an inner side thereof to alleviate impact and friction between the housing body and the movable bracket when the movable bracket is housed in the openable case.

14. The display module exhibition station of claim 10, further having a plurality of fastening elements, the support rack having two ends each includes a first screw hole, the housing body having a second screw hole corresponding to the first screw hole to allow the support rack and the housing body to pivotally engage with each other through the fastening elements.

15. The display module exhibition station of claim 10, wherein the support rack has one end pivotally engaged with the holding rack to selectively fix a relative angle between the holding rack and the support rack to alter an exhibition angle of the display module.

16. The display module exhibition station of claim 10, wherein the support rack includes a first support rack and a second support rack, the first support rack having two ends respectively and pivotally engaged with the holding rack and the second support rack, the second support rack being pivotally engaged with the housing body, the first support rack and the second support rack forming an angle which is fixable selectively.

17. The display module exhibition station of claim 16, wherein the first support rack and the second support rack have respectively a cable opening to allow cables of the display module to pass through and connect to the system box when the display module is mounted onto the system box to obtain the electric power and the signals.

18. The display module exhibition station of claim 1, wherein the openable case is closed, and the movable bracket is housed inside the openable case or extended outside the openable case through the opening.

19. The display module exhibition station of claim 10, wherein the openable case is closed, and the movable bracket is housed inside the openable case or extended outside the openable case through the opening.

20. The display module exhibition station of claim 1, wherein the openable case is closed, and the opening is exposed on the openable case.

21. The display module exhibition station of claim 10, wherein the openable case is closed, and the opening is exposed on the openable case.

\* \* \* \* \*